US008817119B2

(12) United States Patent
Ezoe et al.

(10) Patent No.: US 8,817,119 B2
(45) Date of Patent: *Aug. 26, 2014

(54) CAMERA DEVICE, CAMERA SYSTEM, CONTROL DEVICE AND PROGRAM

(75) Inventors: Toshihiro Ezoe, Kanagawa (JP); Kazunori Sakaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 298 days.

This patent is subject to a terminal disclaimer.

(21) Appl. No.: 13/189,291

(22) Filed: Jul. 22, 2011

(65) Prior Publication Data

US 2012/0026343 A1 Feb. 2, 2012

(30) Foreign Application Priority Data

Jul. 30, 2010 (JP) .............................. P2010-171344

(51) Int. Cl.
  *H04N 5/232* (2006.01)
(52) U.S. Cl.
  USPC .................................... 348/211.8; 348/211.3
(58) Field of Classification Search
  CPC ................................................. H04N 5/23225
  USPC ............ 348/211.99–211.4, 211.8, 42, 50, 51, 348/143
  See application file for complete search history.

(56) References Cited

U.S. PATENT DOCUMENTS

| | | | |
|---|---|---|---|
| 6,414,716 B1 | 7/2002 | Kawai | |
| 6,469,737 B1 | 10/2002 | Igarashi et al. | |
| 6,727,940 B1 * | 4/2004 | Oka et al. | ................... 348/211.3 |
| 6,741,276 B1 | 5/2004 | Yonezawa et al. | |
| 6,836,287 B1 | 12/2004 | Nakahara | |
| 7,106,364 B1 | 9/2006 | Noro et al. | |
| 7,450,840 B2 | 11/2008 | Ohnishi et al. | |
| 8,312,133 B2 * | 11/2012 | Kurosawa | ..................... 709/224 |
| 2002/0018124 A1 | 2/2002 | Mottur et al. | |
| 2004/0201677 A1 | 10/2004 | Bronson | |
| 2005/0078180 A1 | 4/2005 | Nakamura | |
| 2005/0200716 A1 * | 9/2005 | Takagi et al. | ............ 348/211.99 |

(Continued)

FOREIGN PATENT DOCUMENTS

| | | |
|---|---|---|
| JP | 2000-101991 | 4/2000 |
| JP | 2000-106671 | 4/2000 |

(Continued)

OTHER PUBLICATIONS

Search Report issued in corresponding European application No. 11174699.6 dated Dec. 16, 2013.

(Continued)

*Primary Examiner* — Tuan Ho
(74) *Attorney, Agent, or Firm* — Frommer Lawrence & Haug LLP; William S. Frommer

(57) ABSTRACT

There is provided a camera device includes a first information acquisition portion that acquires first information used to control a first area that is specified within a whole image captured by a camera portion, a second information acquisition portion that acquires second information used to control a second area that is specified within the whole image, a control portion that controls mechanical movement of the camera portion based on the first information, and an image processing portion that acquires an image of the first area from the whole image captured by the camera portion, and that extracts an image of the second area from within the first area based on the second information.

15 Claims, 13 Drawing Sheets

(56) References Cited

U.S. PATENT DOCUMENTS

| | | |
|---|---|---|
| 2006/0220836 A1 | 10/2006 | Wei et al. |
| 2007/0113255 A1 | 5/2007 | Kurosawa |
| 2007/0120979 A1 | 5/2007 | Zhang et al. |
| 2008/0106597 A1 | 5/2008 | Amini et al. |
| 2009/0245637 A1 | 10/2009 | Barman et al. |
| 2010/0002071 A1 | 1/2010 | Ahiska |
| 2010/0066829 A1 | 3/2010 | Mizutani et al. |
| 2011/0199484 A1 | 8/2011 | Uchihara |
| 2012/0262574 A1* | 10/2012 | Park et al. .................... 348/143 |

FOREIGN PATENT DOCUMENTS

| | | |
|---|---|---|
| JP | 2004-194217 | 7/2004 |
| JP | 2004-254031 | 9/2004 |
| JP | 2005 354748 | 12/2005 |
| JP | 2006-115046 | 4/2006 |
| JP | 2006-245793 | 9/2006 |
| JP | 2007-166583 | 6/2007 |
| JP | 2007-214793 | 8/2007 |
| JP | 2007-259330 | 10/2007 |
| JP | 2008-99159 | 4/2008 |
| JP | 2009-17221 | 1/2009 |

OTHER PUBLICATIONS

Japanese Office Action dated Jan. 28, 2014, document No. 2010-171344.

Office Action issued Jan. 28, 2014 in Japanese Patent Application No. 2010-108564.

Office Action issued Jan. 28, 2014 in Japanese Patent Application No. 2010-108563.

Extended European Search Report issued Apr. 20, 2012 in Patent Application No. 11164391.2.

* cited by examiner

FIG.2
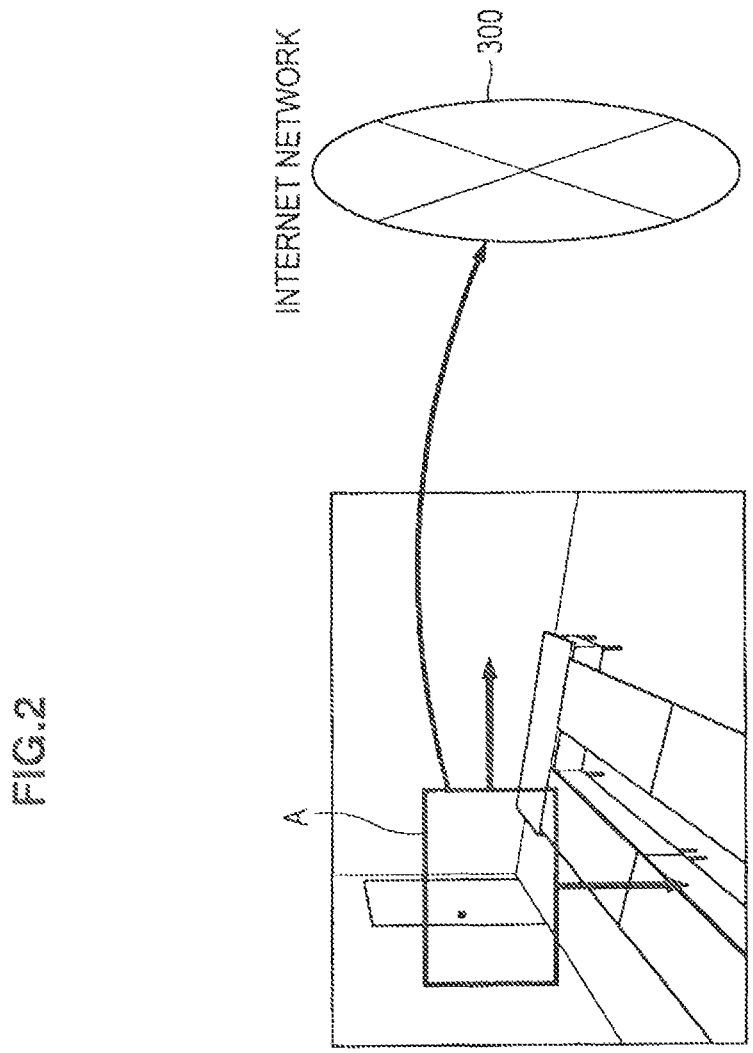
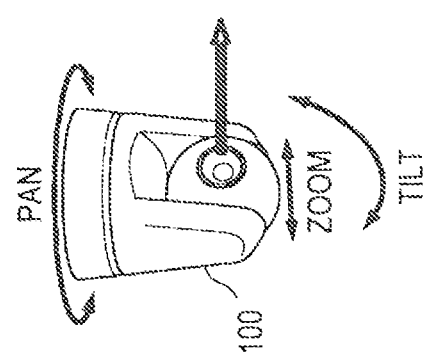

FIG.6
INDEPENDENT CONTROL OF IMAGE AREA R1 AND IMAGE AREA R2
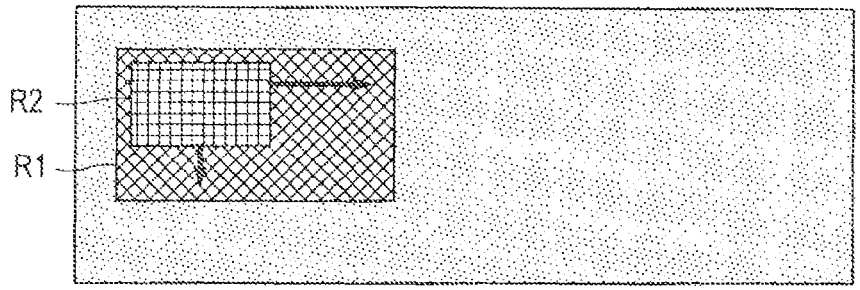
 WHOLE IMAGE
 MECHANICAL PTZ DISPLAY AREA (R1)
 DIGITAL PTZ DISPLAY AREA (R2)
FIG.7
CONTROL OF IMAGE AREA R1 AND IMAGE AREA R2 IN CONCERT
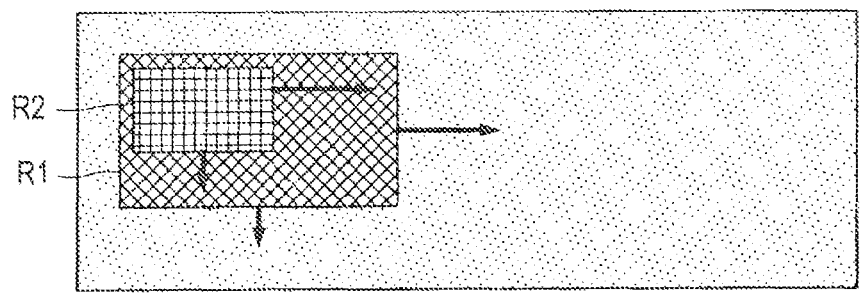
 WHOLE IMAGE
 MECHANICAL PTZ DISPLAY AREA (R1)
 DIGITAL PTZ DISPLAY AREA (R2)

FIG.8
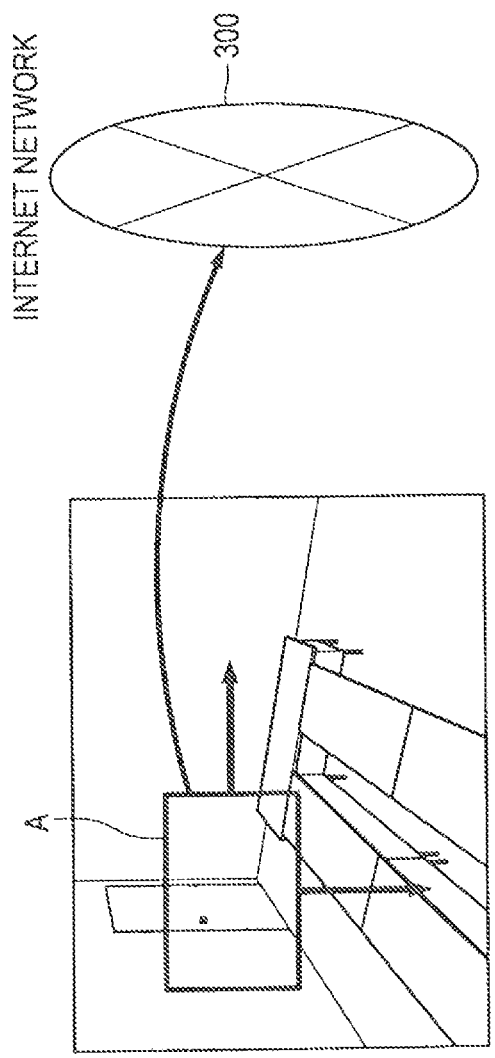
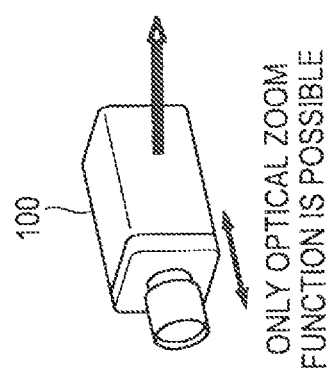
ONLY OPTICAL ZOOM FUNCTION IS POSSIBLE

WHOLE IMAGE
OPTICAL ZOOM DISPLAY AREA (R1)
DIGITAL PTZ DISPLAY AREA (R2)

□ WHOLE IMAGE
▨ OPTICAL ZOOM DISPLAY AREA (R1)
▦ DIGITAL PTZ DISPLAY AREA (R2)
+ CENTER OF DIGITAL PTZ DISPLAY AREA
+ CENTER OF OPTICAL ZOOM DISPLAY AREA

□ WHOLE IMAGE
▨ MECHANICAL PTZ DISPLAY AREA (R1)
▦ DIGITAL PTZ DISPLAY AREA (R2)

FIG.13
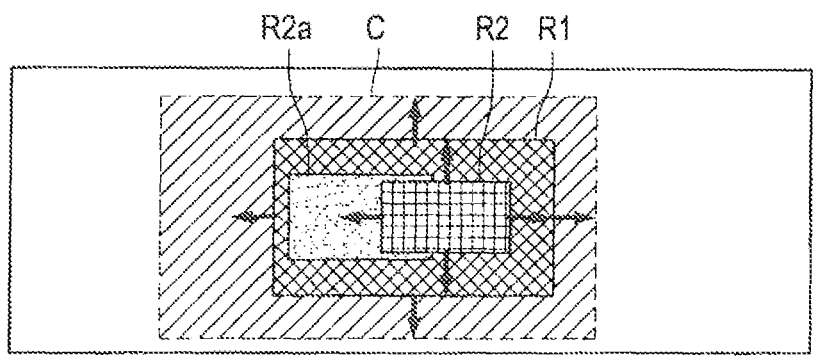
 WHOLE IMAGE
 MECHANICAL PTZ DISPLAY AREA (R1)
 DIGITAL PTZ DISPLAY AREA (R2)
 DIGITAL PTZ DISPLAY AREA (R2a) OF OTHER CLIENT
 AREA (C) ON WHICH MECHANICAL PTZ OPERATIONS ARE POSSIBLE

| | WHOLE IMAGE |
| --- | --- |
| | MECHANICAL PTZ DISPLAY AREA (R1) |
| | DIGITAL PTZ DISPLAY AREA (R2) |
| | DIGITAL PTZ DISPLAY AREA (R2a) OF OTHER CLIENT |
| | AREA ON WHICH MECHANICAL PTZ OPERATIONS ARE POSSIBLE |

| | WHOLE IMAGE |
| --- | --- |
| | MECHANICAL PTZ DISPLAY AREA (R1) |
| | DIGITAL PTZ DISPLAY AREA (R2) |

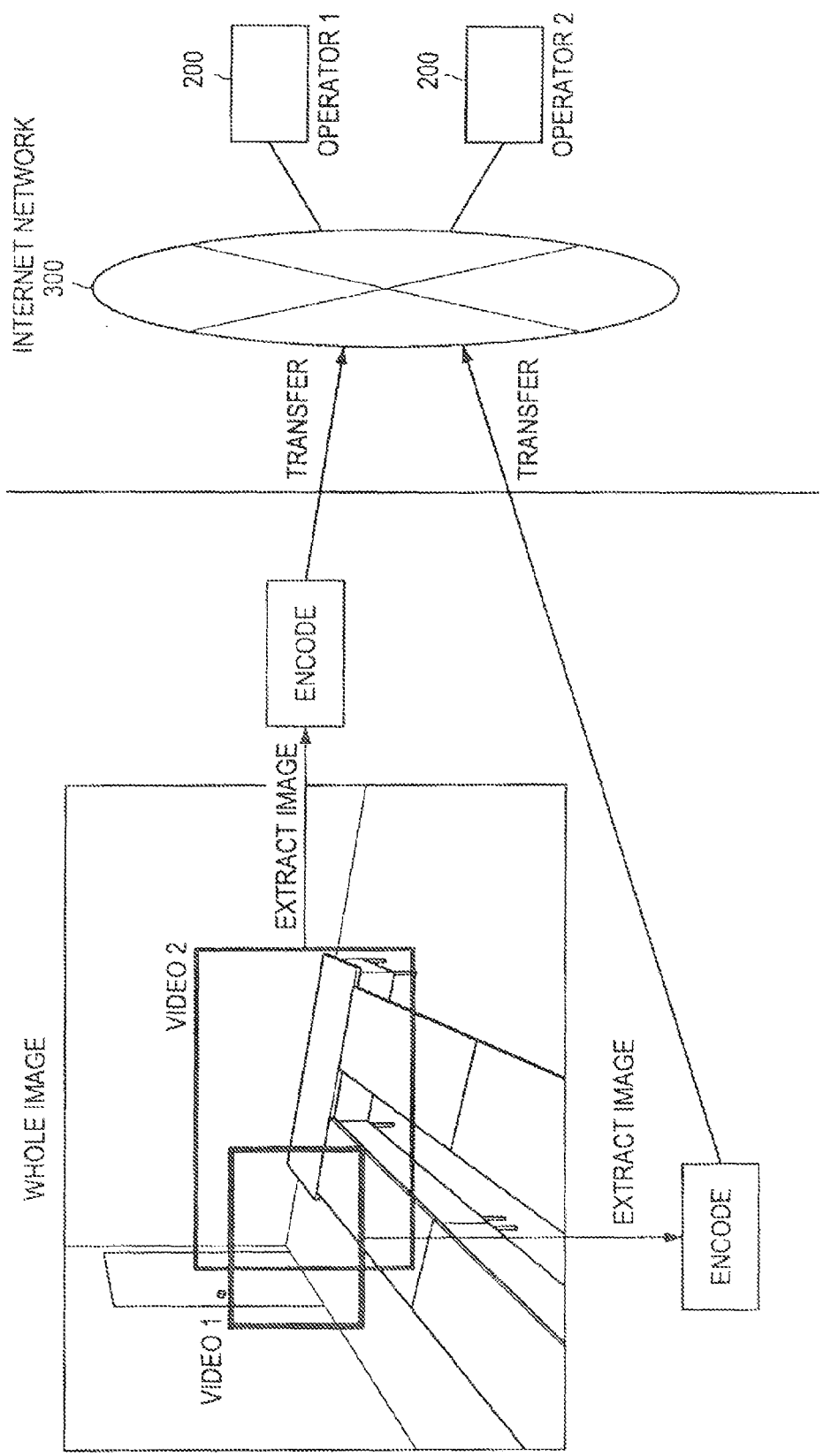

CAMERA DEVICE, CAMERA SYSTEM, CONTROL DEVICE AND PROGRAM

BACKGROUND

The present disclosure relates to a camera device, a camera system, a control device and a program.

In related art, a camera control system is known in which a range that can be captured by a camera is displayed as a whole image, and an imaging direction of the camera is controlled by an operation performed on the whole image. This camera control system is described, for example, in Japanese Patent Application Publication No. JP-A-2005-354748. Further, a camera control system is known in which sections corresponding to preset sections are displayed as thumbnails, and when a desired one of the thumbnails is selected, the imaging direction of the camera is controlled to the corresponding preset section.

SUMMARY

However, in the technology disclosed in Japanese Patent Application Publication No. JP-A-2005-354748, as an image is acquired by performing mechanical controls, such as pan, tilt and zoom, on the camera terminal device side, it is assumed that there are limitations on a range of the image that can be acquired. Further, when it is assumed that digital pan, tilt and zoom operations etc. are performed to digitally extract a desired area from the whole image, it is difficult to perform the digital pan, tilt and zoom operations and the mechanical pan, tilt and zoom operations in a mutually efficient manner.

In light of the foregoing, it is desirable to provide a camera device, a camera system, a control device and a program, which are novel and improved, and which are capable of easily and efficiently performing digital pan, tilt and zoom operations and mechanical pan, tilt and zoom operations.

According to an embodiment of the present invention, there is provided a camera device includes a first information acquisition portion that acquires first information used to control a first area that is specified within a whole image captured by a camera portion, a second information acquisition portion that acquires second information used to control a second area that is specified within the whole image, a control portion that controls mechanical movement of the camera portion based on the first information, and an image processing portion that acquires an image of the first area from the whole image captured by the camera portion, and that extracts an image of the second area from within the first area based on the second information.

In this configuration, when a change of the first area is not specified by the first information and the second area is changed within the first area, the control portion fixes movement of the camera portion, and the image processing portion extracts the image of the second area that is changed within the first area.

In this configuration, when the first area is changed in a range that includes the second area, the image processing portion does not change a position of the second area and extracts the image of the second area from within the first area.

In this configuration, the control portion controls movement of the camera portion based on the first information, and also, when the second area is specified such that it exceeds a range of the first area, the control portion controls movement of the camera portion based on the second information.

In this configuration, when the second area moves in accordance with movement of the camera portion and is located outside the first area, the image processing portion changes the second area such that the second area is within the first area and extracts the image of the second area.

In this configuration, when the second area is changed, the control portion controls movement of the camera portion such that a positional relationship between the first area and the second area is maintained in a same state.

In this configuration, when the first area is changed, the image processing portion changes the second area such that a positional relationship between the first area and the second area is maintained in a same state and extracts the image of the second area.

According to another embodiment of the present invention, there is provided a camera system in which a camera terminal device that captures images and a client terminal device that controls the camera terminal device are connected via a network. The camera terminal device includes a first information acquisition portion that acquires first information used to control a first area that is specified within a whole image captured by a camera portion, a second information acquisition portion that acquires second information used to control a second area that is specified within the whole image, a control portion that controls mechanical movement of the camera portion based on the first information, and an image processing portion that acquires an image of the first area from the whole image captured by the camera portion, and that extracts an image of the second area from within the first area based on the second information.

According to another embodiment of the present invention, there is provided a control device includes a first information acquisition portion that acquires first information used to control a first area that is specified within a whole image captured by a camera terminal device, a second information acquisition portion that acquires second information used to control a second area that is specified within the whole image, a transmitting portion that transmits to the camera terminal device control information used to control mechanical movement of a camera portion based on the first information, and an image processing portion that acquires an image of the first area from the whole image captured by the camera portion, and that extracts an image of the second area from within the first area based on the second information.

In this configuration, the control device further includes a display portion that displays both the whole image and a partial image corresponding to the image of the second area.

In this configuration, the transmitting portion transmits control information to control movement of the camera portion based on the first information, and also to control movement of the camera portion based on the second information when the second area is specified such that the second area exceeds a range of the first area.

In this configuration, when the second area moves in accordance with movement of the camera portion and is located outside the first area, the image processing portion changes the second area such that the second area is within the first area and extracts the image of the second area.

In this configuration, when the second area is changed, the transmitting portion transmits control information to control movement of the camera portion such that a positional relationship between the first area and the second area is maintained in a same state.

In this configuration, when the first area is changed, the image processing portion changes the second area such that a positional relationship between the first area and the second area is maintained in a same state and extracts the image of the second area.

According to another embodiment of the present invention, there is provided a program that includes instructions that command a computer to function as a unit that acquires first information used to control a first area that is specified within a whole image captured by a camera portion, a unit that acquires second information used to control a second area that is specified within the whole image, a unit that controls mechanical movement of the camera portion based on the first information; and a unit that acquires an image of the first area from the whole image captured by the camera portion, and extracts an image of the second area from within the first area based on the second information.

According to another embodiment of the present invention, there is provided a control device includes a display control portion that performs control such that a whole image area is displayed, the whole image area displaying a whole image captured by a camera, and a camera control portion that controls the camera such that the camera captures a direction corresponding to a first area specified on the whole image. The display control portion displays a partial image area in which an image is displayed by enlarging a second area included in the first area, and performs control such that the first area and the second area are displayed in different display states on the whole image.

In this configuration, the display control portion performs control such that the second area is changeable when the second area is within a range of the first area.

In this configuration, when the second area is operated and changed, when it is attempted to change the second area such that the second area exceeds a range of the first area, the display control portion changes the first area also and performs control such that the second area is included within the range of the first area. The camera control portion performs control such that a direction corresponding to the changed first area is captured.

According to the present disclosure, it is possible to easily and efficiently perform digital pan, tilt and zoom operations and mechanical pan, tilt and zoom operations.

BRIEF DESCRIPTION OF THE DRAWINGS

FIG. 2 is a schematic diagram that illustrates processing performed by the imaging system;

FIG. 6 is a schematic diagram that illustrates an operation method 1 of an image area R1 and an image area R2;

FIG. 7 is a schematic diagram that illustrates an operation method 2 of the image area R1 and the image area R2;

FIG. 8 is a diagram that schematically shows a configuration in a case in which a camera terminal device only has a mechanical zoom function;

FIG. 13 is a schematic diagram that shows a case in which one of the client terminals has the control right for both the image area R1 and the image area R2 and one of the other client terminals has a control right for digital PTZ;

FIG. 16 is a schematic diagram that shows a state in which two different videos, video 1 and video 2, corresponding to the image area R2 are transmitted to each of the client terminals.

DETAILED DESCRIPTION OF THE EMBODIMENT(S)

Figure 1:
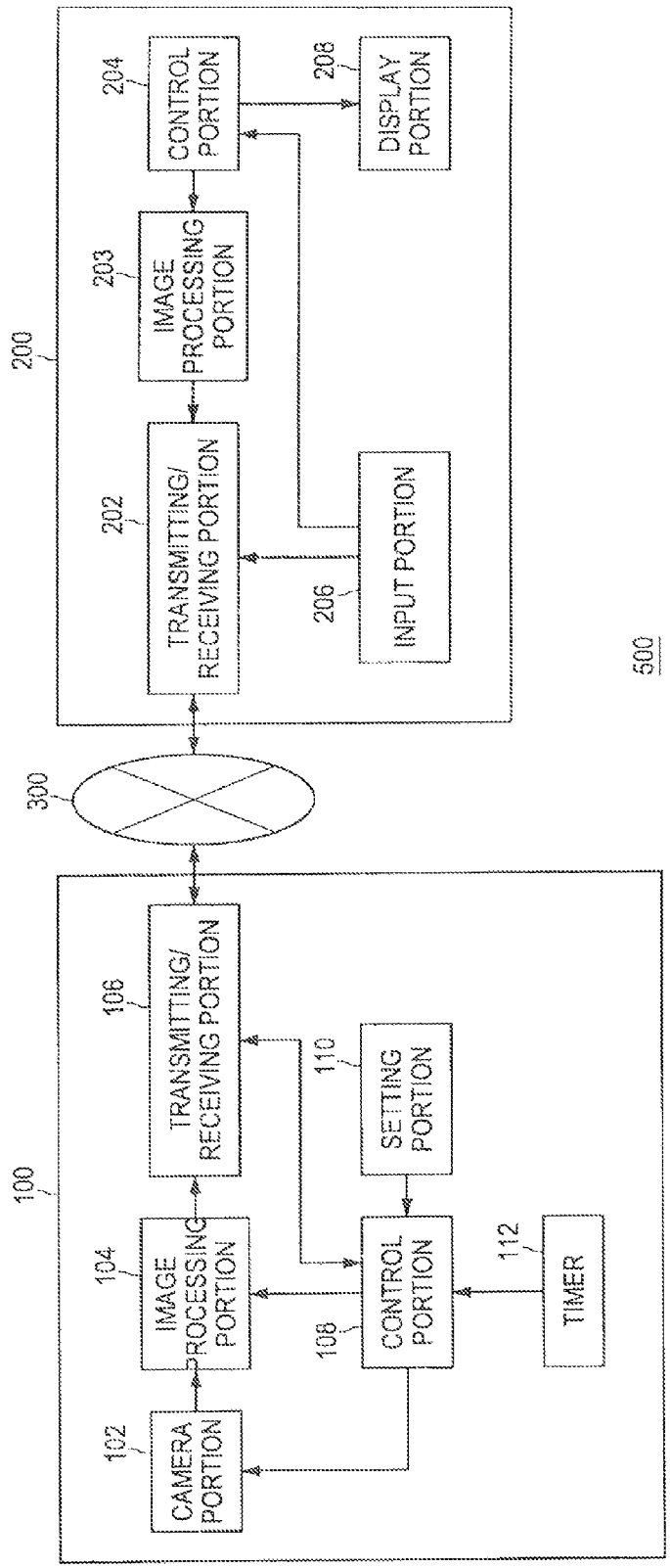
FIG. 1 is a schematic diagram that shows an overall configuration of an imaging system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the order shown below.

1. First embodiment
(1) Configuration example of imaging system
(2) Processing of present embodiment
(3) Operation method 1
(4) Operation method 2
2. Second embodiment
(1) Overview of second embodiment
(2) Operation method 1
(3) Operation method 2
3. Third embodiment
(1) Display and operation when control right is assigned
(2) Example of assigning control right
(3) Processing relating to assignment of control right First Embodiment (1) Configuration Example of Imaging System FIG. 1 is a schematic diagram that shows an overall configuration of an imaging system 500 according to an embodiment of the present disclosure. The imaging system 500 includes a camera terminal device (IP camera) 100 and a plurality of client terminals 200. The camera terminal device 100 and each of the client terminals 200 are connected via a network 300, such as the Internet. In addition, a server 400 is connected to the network 300 and the server 400 is connected via the network 300 to the camera terminal device 100 and the plurality of client terminals 200.

The camera terminal device 100 is, for example, a monitoring camera that is placed indoors or outdoors, and the camera terminal device 100 is provided with a camera portion 102, which includes a lens optical system that forms an image of a subject and an imaging element that photoelectrically converts the formed subject image. The camera terminal device 100 is additionally provided with an image processing portion 104, a transmitting/receiving portion 106, a control portion 108, a setting portion 110 and a timer 112.

The client terminal 200 is, for example, a device such as a personal computer (PC). The client terminal 200 is provided with a transmitting/receiving portion 202, a control portion 204, an input portion 206 and a display portion 208. Note that each of the functional blocks of the camera terminal device 100 and the client terminal 200 shown in FIG. 1 are formed by hardware (circuits) or by an arithmetic processing unit such as a central processing unit (CPU), and software (a program) that causes the arithmetic processing unit to function. In the latter case, the program can be stored in a memory provided in the camera terminal device 100 or in the client terminal 200, or the program can be stored in a recording medium, such as an external memory that is inserted from outside. The server 400 is provided with similar image processing functions as those of the camera terminal device 100, and the server 400 can record images acquired by the camera terminal device 100. The server 400 may also be provided with functions of the client terminal 200. Furthermore, the functions of the server 400 may be integrated with the camera terminal device 100.

FIG. 2 is a schematic diagram that illustrates processing performed by the imaging system 500. Here, as an example, the camera terminal device 100 is placed in an indoor conference room. As shown in FIG. 2, the camera portion 102 of the camera terminal device 100 captures, as a whole image, a relatively wide range within the conference room.

The whole image is, for example, transmitted to the client terminals 200 as still image data, but the disclosure is not limited to this example. Live video may be transmitted to the client terminals 200, and each of the client terminals 200 receiving the live video may extract still images. A user can use the client terminal 200 to specify a desired range from within the whole image. For example, when an area A shown in FIG. 2 is specified by the client terminal 200, the camera terminal device 100 encodes live video data of the area A and transmits the encoded data to the client terminal 200.

More specifically, a whole image of a still image (not live video in this case) that is transmitted in advance from the camera terminal device 100 is displayed on the display portion 208 of the client terminal 200 by processing performed by the control portion 204. When the user operates the input portion 206 of the client terminal 200 and specifies the selected area A from within the whole image, information of the area A is transmitted to the control portion 204. Based on a command by the control portion 204, the transmitting/receiving portion 202 of the client terminal 200 transmits the information of the area A to the camera terminal device 100. Further, based on a command by the control portion 204, the information of the area A (corresponding to an image area R2 that will be explained later) is displayed within the whole image on the display portion 208.

When the transmitting/receiving portion 106 of the camera terminal device 100 receives, via the network 300, the information relating to the area A (second information as referred to in the claims), it transmits the information to the control portion 108. The control portion 108 issues a command to the image processing portion 104 to extract and perform encoding processing on only the area A section from the image (live video) transmitted from the camera portion 102. The transmitting/receiving portion 106 receives the live video of the encoded area A from the image processing portion 104 and transmits the live video to the client terminal 200 via the network 300.

When the transmitting/receiving portion 202 of the client terminal 200 receives the live video of the area A from the camera terminal device 100, it transmits the data to an image processing portion 203. In the image processing portion 203, the information of the area A is decoded and the control portion 204 conducts processing to perform display on the display portion 208. Note that, in this case, the area A corresponds to the image area R2 that will be explained later.

In this way, the user operates the client terminal 200 and specifies a selected area from within the whole image, and can thus digitally perform operations that are equivalent to performing mechanical pan, tilt and zoom (PTZ) operations. As a result, the video of the selected area can be acquired.

In particular, recently, capacity of the network 300 has expanded, and it is thus possible to transmit high definition video with a higher number of pixels. However, when all data of the whole image is sent as live video, the data volume is enormous. By transferring only necessary data of the area specified on the user side, as in the present embodiment, it is possible to view high definition video of the selected area.

It should be noted that extraction of the area A using the image processing may be performed on the client terminal 200 side. In this case, the image processing portion 203 (which corresponds to the image processing portion 104) is provided in the client terminal 200, and the camera terminal device 100 encodes an image (live video) transmitted from the camera portion 102 and transmits the encoded data from the transmitting/receiving portion 106 to the network 300. When the user operates the input portion 206 of the client terminal 200 and specifies the selected area A from within the whole image, the control portion 204 commands the image processing portion 203 to extract the area A. When the transmitting/receiving portion 202 of the client terminal 200 receives the live video data, it transmits the live video data to the image processing portion 203 and the area A is extracted by the image processing portion 203. The image of the extracted area A is transmitted from the control portion 204 to the display portion 208 and displayed on the display portion 208.

Further, in the system of the present embodiment, in addition to the digital pan, tilt and zoom operations, mechanical pan, tilt and zoom operations can be performed. As shown in FIG. 2, the camera terminal device 100 is provided with a mechanical mechanism that can change a direction of an optical axis of the imaging optical system in pan and tilt directions. In addition, the camera terminal device 100 is provided with a mechanical mechanism that can move a zoom optical system of the imaging optical system in the optical axis direction. These mechanical mechanisms are included in the camera portion 102 shown in FIG. 2, and are formed by drive mechanisms, such as a motor and gears. The mechanical pan, tilt and zoom operations can be performed by the camera portion 102 of the camera terminal device 100 driving these mechanical mechanisms in accordance with commands from the control portion 108.

Similarly to the above-described digital pan, tilt and zoom operations, the mechanical pan. tilt and zoom operations can be operated from the client terminal 200 side by specifying an area within the whole image on the client terminal 200.

More specifically, when the user operates the input portion 206 of the client terminal 200 and specifies the selected area A from within the whole image, the transmitting/receiving portion 202 of the client terminal 200 transmits information (first information) of the area A to the camera terminal device 100 based on a command from the control portion 204. Furthermore, based on a command from the control portion 204, the information of the area A (corresponding to an image area R1 to be explained later) is displayed within the whole image on the display portion 208.

When the transmitting/receiving portion 106 of the camera terminal device 100 receives, via the network 300, the information relating to the area A (the first information), it transmits the information to the control portion 108. Based on the information of the area A, the control portion 108 issues a command for the mechanical pan, tilt and zoom positions of the camera portion 102 to the camera portion 102. At this time, the control portion 108 can issue the command for the pan, tilt and zoom positions in accordance with a position of the area A within the whole image and in accordance with a size of the area A. The camera portion 102 controls the mechanical pan, tilt and zoom positions based on the information of the area A. Note that, in this case, the area A corresponds to the image area R1 that will be explained later.

Figure 3:
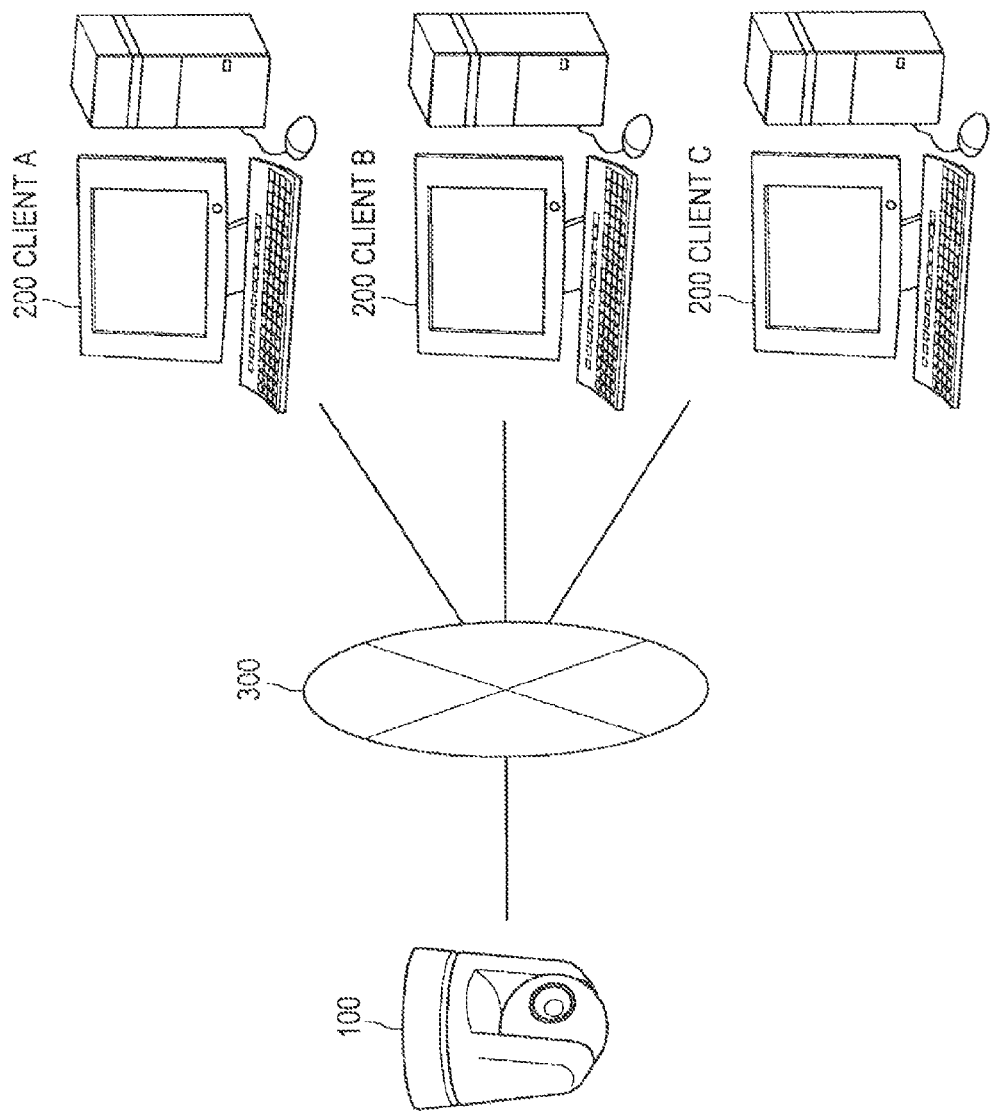
FIG. 3 is a schematic diagram that shows a state in which a plurality of client terminals are connected to a network.

FIG. 3 is a schematic diagram that shows a state in which a plurality of the client terminals 200 are connected to the network 300. Each of the client terminals 200 shown in FIG. 3 can perform both mechanical PTZ operations and digital PTZ operations by specifying a selected area from within the whole image. It should be noted that, in this case, it is assumed that commands from each of the client terminals 200 conflict, and this situation will be described in more detail in a third embodiment.

(2) Processing of Present Embodiment

Figure 4:
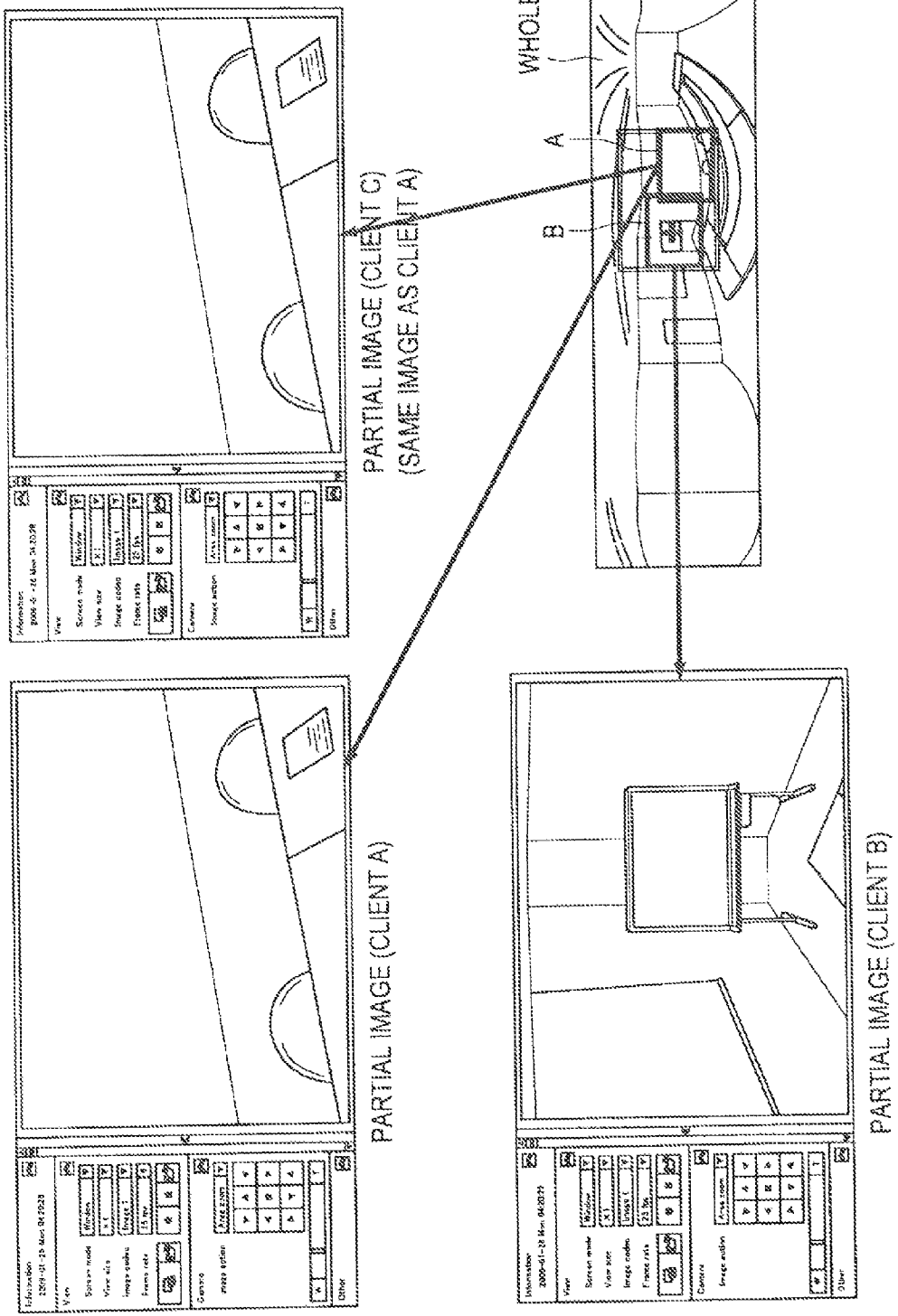
FIG. 4 is a schematic diagram that shows display screens of each of the client terminals.

Next, processing according to the present embodiment will be explained. FIG. 4 is a schematic diagram that shows display screens of each of the client terminals 200. The above-described whole image and a partial image are both displayed on each of the client terminals 200. In FIG. 4, a common whole image is displayed on all of the client terminals 200, and an individual partial image is displayed per each of the client terminals 200.

The whole image is a wide-range image captured in advance by the camera terminal device 100, and is, for example, a panorama image that is captured of a widest range over which mechanical pan, tilt and zoom operations are possible by the camera terminal device 100. The whole image can be acquired, for example, by performing mechanical PTZ operations of the camera terminal device 100 to capture a plurality of images with different directions of the optical axis and by connecting the plurality of images.

On the other hand, each of the partial images is an image of a particular range that is specified from within the whole image by the user of each of the client terminals 200, and it is possible to select a different range per each of the client terminals 200. FIG. 4 is a diagram that schematically shows a state in which the whole image and the partial images are shown on each of terminals of clients A, B and C corresponding to each the client terminals 200. In an example in FIG. 4, a partial image corresponding to the area A of the whole image is displayed on the terminal of the client A, and a partial image corresponding to an area B of the whole image is displayed on the terminal of the client B. Similarly to the client A, the partial image corresponding to the area A of the whole image is displayed on the terminal of the client C.

Both the whole image and the partial image are displayed on the display portion 208 of each of the terminals of the clients. In the example shown in FIG. 4, the partial image of the client A and the whole image are displayed on the terminal of the client A, and the partial images of the other clients are not displayed. However, in a case of an administrator or the like, the partial images of the other clients may be displayed on the terminal of the client A. Further, as will be described later, it is possible to display areas corresponding to the partial images of the other clients within the whole image displayed on the terminal of the client A. In this way, the areas of the partial images of the other clients can be ascertained on the terminal of the client A.

Figure 5:
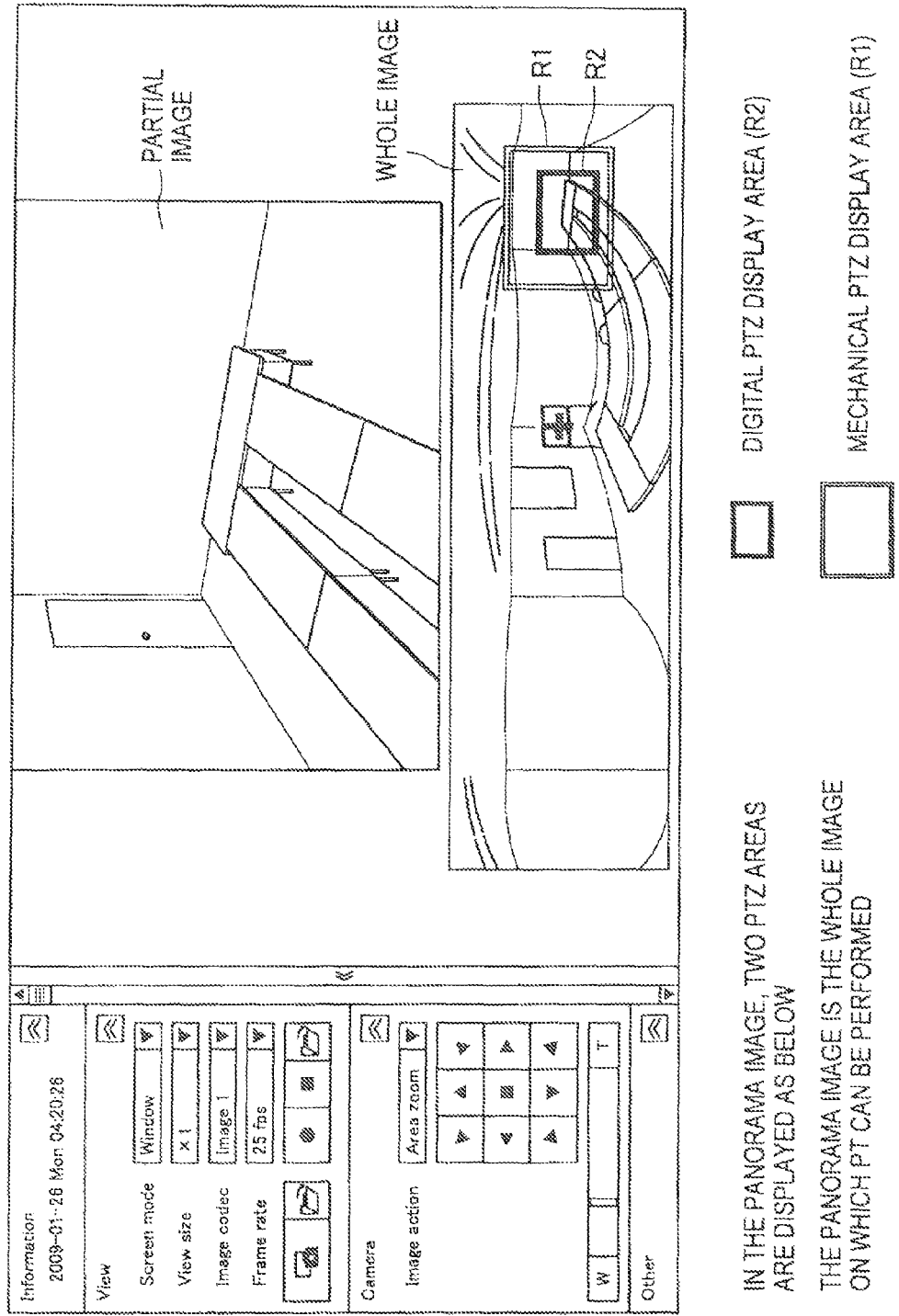
FIG. 5 is a schematic diagram that shows a whole image and a partial image that are shown on each of the client terminals.

FIG. 5 is a schematic diagram that shows the whole image and the partial image displayed on each of the client terminals 200. As shown in FIG. 5, the image area R1 defined by the mechanical PTZ and the image area R2 defined by the digital PTZ are both displayed on the whole image displayed on each of the client terminals 200. The image area R1 defined by the mechanical PTZ indicates an image area specified by mechanical movement of the camera terminal device 100 and indicates an image area in a state in which digital PTZ operations are not performed. In other words, the image area R1 defined by the mechanical PTZ corresponds to an image area that is displayed when the pan, tilt and zoom positions according to mechanical processing by the camera terminal device 100 are unchanged. Thus, when the mechanical pan, tilt and zoom positions of the camera terminal device 100 are changed, a range of the image area R1 defined by the mechanical PTZ is changed.

As described above with reference to FIG. 3, in the system of the present embodiment, the plurality of client terminals 200 are connected to the single camera terminal device 100. Therefore, the image area R1 defined by the mechanical PTZ corresponds to the mechanical pan, tilt and zoom positions of the single camera terminal device 100 and is the same range on each of the client terminals 200. Thus, the same image area R1 is displayed within the whole image displayed on each of the client terminals 200.

On the other hand, the image area R2 defined by the digital PTZ corresponds to an image area that is a section extracted by digital operations from within the image area R1 defined by the mechanical PTZ. As a result, in principle, the image area R2 defined by the digital PTZ is a narrower range than the image area R1 defined by the mechanical PTZ. When the image area R2 defined by the digital PTZ is specified within the image area R1 defined by the mechanical PTZ, the image area R2 is extracted from within the image area R1 and displayed, by image processing performed by the camera terminal device 100 or the client terminal 200. The partial images shown in FIG. 4 and FIG. 5 correspond to the digital PTZ image area R2, which is extracted, in accordance with specification by the user, from within the image area R1 defined by the mechanical PTZ. The control portion 204 of the client terminal 200 may perform control to execute display on the display portion 208 such that display states of the image area R1 and the image area R2 are different. For example, display may be performed such that outer contours of the image area R1 and the image area R2 are different colors. In this way, the user can visually distinguish between the image area R1 and the image area R2.

As shown in FIG. 5, within the whole image displayed on each of the client terminals 200, along with the image area R1 that is common to all of the client terminals 200 and that is defined by the mechanical PTZ, the image area R2 that is defined by the digital PTZ and specified from within the image area R1 is also displayed. By operating the input portion 206 (which is a mouse, a keyboard or the like) of the client terminal 200, the user can specify the image area R1 and the image area R2 from within the whole image, and can change the image area R1 and the image area R2 to a selected range. Hereinafter, the specification and changing of the image area R1 and the image area R2 will be explained in more detail.

(3) Operation Method 1

FIG. 6 is a schematic diagram that illustrates an operation method 1 of the image area R1 and the image area R2. In the operation method 1, in order to specify the image area R1 and the image area R2, two types of PTZ operations are performed individually. Hereinafter, a case will be explained in which the user performs the PTZ operations by operation of a mouse.

In a case in which the user specifies the image area R2 and performs the digital PTZ operations, when operation of the image area R2 is performed within a display area of the image area R1, operations that change the image area R2 are performed while the image area R1 remains in a fixed state. When the user sets the image area R2 within the range of the image area R1, the image area R1 is not changed, and the mechanical PTZ positions of the camera terminal device 100 are not changed. Thus, when the user selects the image area R2 within the range of the image area R1, the image area R2 specified from within the image area R1 by the image processing is extracted and displayed as the partial image without performing mechanical operations. In such a case, when the image area R1 is not changed, even if another user, such as the client B shown in FIG. 4, is displaying the image of the different image area R2 as the partial image, the other user can continue to see the partial image without problem.

Furthermore, when the user specifies the image area R1 and performs the PTZ operations, as long as the display area of the image area R2 is within an imaging range, the digital PT is fixed and mechanical PT operations are performed to change the image area R1.

Next, in a case in which the user specifies the image area R2 and performs digital PT operations, when pan and tilt are performed outside the display area of the mechanical PT operations, namely, when the user tries to expand the specification of the image area R2 beyond the range of the image area R1, mechanical PT operations are performed in concert with the digital PT operations, and the image area R1 is caused to be changed such that the image area R2 is within the image area R1. In this way, when the user operates the image area R2 and performs PTZ operations outside the display area of the image area R1, the image outside the range of the image area R1 is specified, and thus operations are performed to change the mechanical PTZ positions of the camera terminal device 100.

In addition, as a separate example, when the image area R2 is operated, the PT operations of the image area R1 may be performed regardless of whether or not the image area R2 is within the image area R1.

Furthermore, in the case in which the user specifies the image area R1 and performs the mechanical PT operations. when the digital PT image area R2 is outside the display area of the image area R1, the digital PT operations are performed in concert with the mechanical PT operations, thus causing the image area R2 to be changed such that the image area R2 is within the image area R1.

By the above-described operations, the user can perform the mechanical PT operations or the digital PT operations by specifying the image area R1 and the image area R2, respectively. In addition, in a case in which operation of one of the image area R1 and the image area R2 makes it difficult to display the other image area, by changing the other image area in concert, it is possible to constantly set the image area R2 within the image area R1 by changing the other image area in concert.

The specification and the changing of the image area R1 and the image area R2 is achieved by the user using the mouse to perform click and drag operations on the whole image. For example, in a state in which the image area R1 (or the image area R2) is selected, by clicking a selected point within the whole image, the user can move a center of the image area R1 (or the image area R2) to the position of the clicked point. Alternatively, in a state in which the image area R1 (or the image area R2) is selected, the user can perform a drag operation to cause the image area R1 (or the image area R2) to move to a selected position.

In addition, when a selected point is clicked on the whole image, if the clicked point is within the image area R1, the center of the image area R2 (digital PT) can be aligned with the clicked position while the image area R1 (mechanical PT) is fixed. If the clicked point is outside the display area of the image area R1, both the mechanical and digital operations can be performed such that the centers of both the mechanical and digital display areas are aligned with the clicked position.

In this case, the center of the digital PT image area R2 is aligned with the clicked position while the center of the image area R1 defined by the mechanical PT need not be the clicked position. Alternatively, the mechanical PT may be performed such that the image area R2 just fits into the image area R1. In this way, it is possible to reduce to a minimum an amount of operation of the mechanical PT.

With respect to the zoom operations, in principle, when the mechanical or digital zoom operations are specified (when the image area R1 or the image area R2 is specified), zoom control is performed only for the zoom on the specified side similarly to the above-described PT operations.

Further, when the mechanical or digital zoom operations are not specified, when a command is issued to perform the zoom operation, first the mechanical zoom is performed within a range in which the mechanical zoom is possible, thus changing the image area R1. By doing this, both the images within the image area R1 and within the image area R2 are enlarged, and the range corresponding to the image area R2 is displayed as the partial image. Then, when the mechanical zoom has reached a maximum in the telephoto (zoom in) direction (when the mechanical zoom has reached the telephoto end), processing is performed to further enlarge the range of the image area R2 using the digital zoom.

In the operation method 1, when the image area R2 is specified and the image area R2 is moved, as the image area R1 is only moved over a minimum range, an impact on the other client terminal 200 can be minimized when the other client terminal 200 performs the digital PTZ operations.

(4) Operation Method 2

FIG. 7 is a schematic diagram that illustrates an operation method 2 of the image area R1 and the image area R2. In the operation method 2, the mechanical PTZ, operations and the digital PTZ operations are caused to operate in concert with each other. In FIG. 7, even in a case in which one of either the image area R1 (the mechanical PT) and the image area R2

(the digital PT) is specified and the area is moved, a positional relationship between the image area R1 and the image area R2 is maintained in a same state, and the image area R1 and the image area R2 are moved in parallel.

For example, in a state in which the image area R1 (or the image area R2) is selected, if the user clicks a selected point in the whole image, it is possible to move the center of the image area R2 to the clicked point while maintaining the positional relationship between the image area R1 and the image area R2 in the same state.

Further, when performing the zoom operation also, if one of either the image area R1 (the mechanical PT) and the image area R2 (the digital PT) is specified and the area is moved, the zoom operation is performed such that a scale ratio between the image area R1 and the image area R2 is constant.

In the operation method 2, when the camera terminal device 100 is tracking and capturing a given object, as the image area R1 and the image area R2 move together, the tracked object can be tracked reliably within the image area R1. In addition, even if the tracked object temporarily moves outside the image area R2, as the image area R1 is being moved together with the image area R2, by constantly recording the image area R1, it is possible to subsequently acquire the object that could not be tracked.

As described above, according to the first embodiment, it is possible for the client terminal 200 to specify the mechanical zoom operation and the digital zoom operation and perform a selected control. As a result, in the system in which the mechanical and digital zoom operations are possible, it is possible to acquire an image of a desired range.

Second Embodiment (1) Overview of Second Embodiment

Next, a second embodiment of the present disclosure will be explained. In the second embodiment, the camera terminal device 100 does not have mechanical pan and tilt functions and only has a mechanical zoom (optical zoom) function. FIG. 8 is a diagram that schematically shows a configuration of the camera terminal device 100 when the camera terminal device 100 only has the mechanical zoom function.

As shown in FIG. 8, digital PTZ operations are performed within video that is acquired by a camera lens of the camera terminal device 100. In this case, in accordance with a command from the client terminal 200 side, a part of the video (area A shown in FIG. 8) acquired from the camera lens of the camera terminal device 100 is extracted and transmitted to the client terminal 200. Note that it is also possible that, when the video is transmitted, all of the video acquired from the camera lens is transmitted to the client terminal 200, and the area A is extracted from all of the video and displayed by the receiving side client terminal 200.

Figure 9:
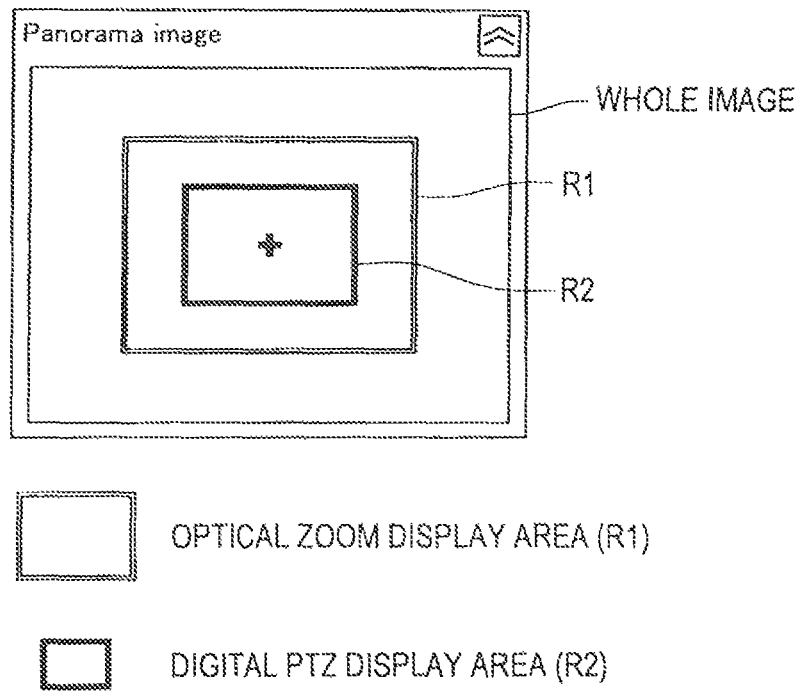
FIG. 9 is a schematic diagram that shows the whole image on each of the client terminal devices.

FIG. 9 is a schematic diagram that shows the whole image on each of the client terminals 200. Similarly to the first embodiment, along with the image area R1 defined by the mechanical Z, the image area R2 that is specified within the image area R1 and that is defined by the digital PTZ is also displayed within the whole image. In the second embodiment, the mechanical pan and tilt operations cannot be performed, and thus the image area R1 defined by the mechanical PTZ is constantly displayed in the center of the whole image. Note that, only the whole image is shown in FIG. 9, but, similarly to FIG. 5, the whole image and the partial image are both displayed on the display portion 208 of each of the client terminals 200.

(2) Operation Method 1

FIG. 10A to FIG. 10E are schematic diagrams that illustrate the operation method 1 of the image area R1 and the image area R2 according to the second embodiment. In the operation method 1, specification of the image area R1 defined by the mechanical optical zoom operation and specification of the image area R2 defined by the digital PTZ operations are performed individually.

Figure 10A:
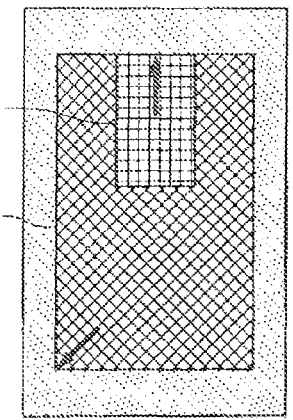
FIG. 10A is a schematic diagram that illustrates the operation method 1 of the image area R1 and the image area R2 according to a second embodiment.
Figure 10B:
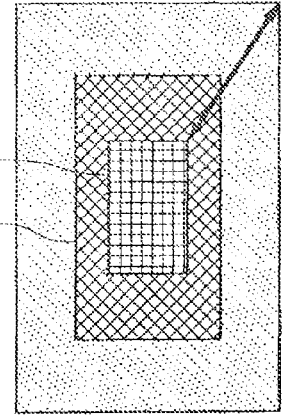
FIG. 10B is a schematic diagram that illustrates the operation method 1 of the image area R1 and the image area R2 according to the second embodiment.

First, in FIG. 10A, if the digital PT operations of the image area R2 are within the display area of the mechanical zoom of the image area R1, the digital PTZ operations of the image area R2 are performed while the image area R1 is in a fixed state. Further, FIG. 10B shows the specification of the image area R1 defined by the optical zoom operation. In FIG. 10B, in a range in which the image area R2 defined by the digital PTZ operations is included in the image area R1, the image area R1 can be changed by the mechanical PT operations within a range indicated by an arrow.

Figure 10C:
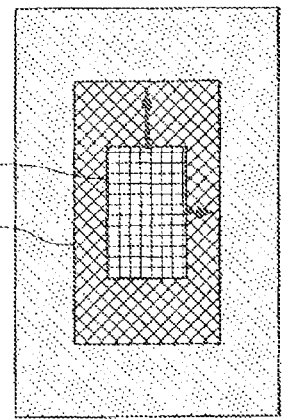
FIG. 10C is a schematic diagram that illustrates the operation method 1 of the image area R1 and the image area R2 according to the second embodiment.

FIG. 10C shows a case in which, when the image area R2 is changed by the digital PTZ operations, an operation is performed in which it is attempted to extend the image area R2 outside the display area of the image area R1. In this case, an operation is performed in concert in which the optical zoom operation is used to expand the image area R1 such that the image area R2 is included in the image area R1.

Figure 10D:
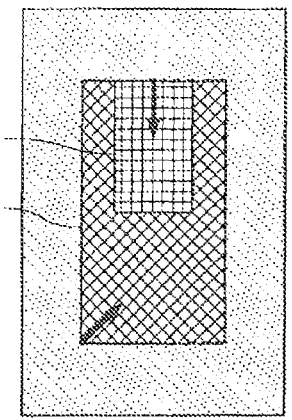
FIG. 10D is a schematic diagram that illustrates the operation method 1 of the image area R1 and the image area R2 according to the second embodiment.

FIG. 10D shows a case in which, when a display ratio of the image area R1 of the optical zoom becomes larger than a predetermined value with respect to the whole image, the mechanical zoom moves to the telephoto side in accordance with the image area R2. In this case, when the image area R2 is moved by the digital PT operations in a direction of the center of the whole image, the optical zoom is performed such that the display ratio approaches the above-described predetermined value by the optical zoom zooming on the telephoto side within the range in which the image area R2 is included in the image area R1. In this way, it is possible to inhibit the area of the image area R1 defined by the optical zoom becoming more extended than necessary, and thus improve definition.

Figure 10E:
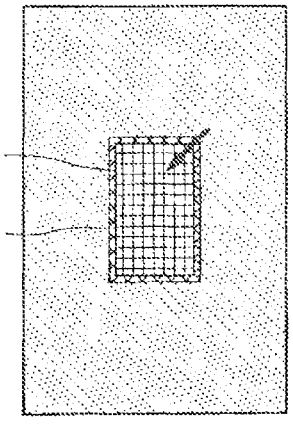
FIG. 10E is a schematic diagram that illustrates the operation method 1 of the image area R1 and the image area R2 according to the second embodiment.

FIG. 10E shows a case in which, while the image area R1 is being operated using the optical zoom operation, a part of the image area R2 defined by the digital PTZ extends outside the image area R1. In this case, digital PT operations are performed in concert such that the image area R2 is within the image area R1.

Further, with respect to the zoom operation also, even when one of either the image area R1 (optical zoom) and the image area R2 (digital zoom) is specified and the specified area is moved, the zoom operation is performed such that a scale ratio between the image area R1 and the image area R2 is maintained at a constant value.

In addition, when the zoom operation is performed, first, the optical zoom is performed within the range of the optical zoom. Then, when the optical zoom has zoomed in to the maximum in the telephoto direction, if the zoom operation is further performed in the telephoto direction, the digital zoom is performed.

(3) Operation Method 2

Figure 11:
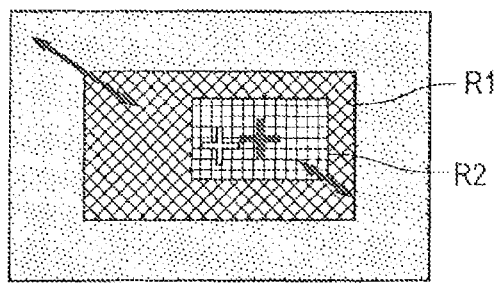
FIG. 11 is a schematic diagram that illustrates the operation method 2 of the image area R1 and the image area R2 according to the second embodiment.

FIG. 11 is a schematic diagram that illustrates the operation method 2 of the image area R1 and the image area R2 according to the second embodiment. In the operation method 2, the optical zoom and the digital zoom can be performed in concert with each other. In FIG. 11, the zoom operation is performed such that the scale ratio between the image area R1 defined by the optical zoom and the image area R2 defined by the digital zoom is maintained at a constant value.

In this case, even if either the mechanical zoom or the digital zoom is specified. the centers of the image area R1 and the image area R2 are respectively fixed, and the zoom is performed while the scale ratio between the image area R1 and the image area R2 is constant.

As described above, according to the second embodiment, even when the camera terminal device 100 does not have the mechanical pan and tilt functions, it is possible to acquire an image of a desired range using the optical zoom function of the camera terminal device 100 and the digital PTZ operations.

Third Embodiment (1) Display and Operation when Control Right is Assigned

Next, a third embodiment of the present disclosure will be explained. The third embodiment relates to a case when there is conflict between commands from each of the above-described client terminals 200, as mentioned above. In this case, in the third embodiment, operation right is assigned to one of the plurality of client terminals 200 and the client terminal 200 that has the operation right performs the PTZ operations. In other words, in the third embodiment, only the client terminal 200 that has the operation right exclusively controls the PTZ operations.

In the present embodiment also, similarly to the first and the second embodiments, both the mechanical PTZ operations and the digital PTZ operations can be performed. For that reason, in the present embodiment, exclusive operation right can be assigned with respect to both the mechanical PTZ operations and the digital PTZ operations.

In this case, as the single camera terminal device 100 is present within the system, the control right for the mechanical PTZ operations can only be held by a selected one of the client terminals 200. On the other hand, it is possible to assign the control right for the digital PTZ operations to the one selected client terminal 200 only or to assign the control right for the digital PTZ operations to the plurality of client terminals 200. Hereinafter, this will be explained in more detail with reference to FIG. 12 to FIG. 15.

Figure 12:
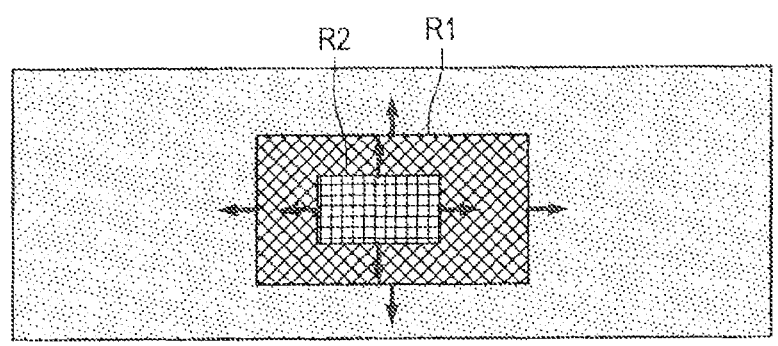
FIG. 12 is a schematic diagram that shows a case in which one of the client terminals has a control right for both the image area R1 and the image area R2 and another of the client terminals does not have a control right.

FIG. 12 shows a case in which a single one of client terminals 200 has the control right for both the image area R1 and the image area R2, and another of the client terminals 200 does not have the control right. In this case, as shown in FIG. 12, the client terminal 200 that has the control right for the image area R1 and the image area R2 can perform both the mechanical PTZ operations and the digital PTZ operations and can freely operate both the image area R1 and the image area R2. In this case, it is possible to freely operate the image area R1 using the mechanical PTZ operations. Further, it is possible to freely operate setting of the image area R2 in the image area R1 using the digital PTZ operations.

Here, when the image area R1 is changed by the client terminal 200 that has the control right for the mechanical PTZ operations, the other client terminal 200 (which does not have the control right for the mechanical PTZ operations and only has the control right for the digital PTZ operations) can operate the image area R2 within the changed image area R1.

In this way, when the single client terminal 200 has the control right for both the mechanical PTZ operations and the digital PTZ operations, the image area R1 and the image area R2 can be freely moved, as shown in FIG. 12.

FIG. 13 shows a case in which the single client terminal 200 has the control right for both the image area R1 and the image area R2 and another of the client terminals 200 (in this case, a single one of the other client terminals 200) has the control right for the digital PTZ operations.

In this case, if the mechanical PTZ operations are unrestricted, the other client terminal 200 that has the control right for the digital PTZ operations cannot perform desired digital PTZ, operations. For that reason, the image area R2 (shown as an image area R2a in FIG. 13), which is defined by the digital PTZ operations for which the other client terminal 200 has the control right, is displayed on the client terminal 200 that has the control right for the mechanical PTZ operations. Then, in order to ensure the display of the image area R2a on the other client terminal 200, the image area R2a and a range that includes the image area R2a (a rectangular range C indicated by broken lines in FIG. 13) are displayed on the client terminal 200 that has the control right for the mechanical PTZ operations and the mechanical PTZ operations are possible only within the range of the broken lines. By putting in place restrictions on the control by the client terminal 200 that has the control right for the mechanical PTZ operations in this way, even when the mechanical PTZ operations are performed, the image area R2 defined by the digital PTZ operations for which the other client terminal 200 has the control right is constantly included in the image area R1, and thus the other client terminal 200 can continue to acquire the partial image of the image area R2a.

Similarly to FIG. 12, in the case shown in FIG. 13 also, on the client terminal 200 that has the control right for the mechanical PTZ operations, the image area R2 can be specified within the image area R1 using the digital PTZ operations and can be acquired as the partial image. Further, as in FIG. 13, there is a case in which the single client terminal 200 has the control right for both the image areas R1 and R2 and the other client terminal 200 has the control right for the image area R2, both the client terminals 200 thus having the control right for the image area R2. In this case, it is possible to allow free control on the side of the single client terminal 200, regardless of whether or not the other client terminal 200 has the control right for the image area R2. In this way, for example, when video of a certain location is wished to be viewed urgently, as the other client terminal 200 has the control right, it is possible to avoid not being able to perform mechanical PTZ operations in that area.

Note that, as it is normally not necessary to display the image area R2a and the range C indicated by the broken lines, it is also possible that the image area R2a and the range C are displayed on the client terminal 200 that has the control right for the mechanical PTZ operations only when the user performs the PTZ, operations.

Further, as the image area R1 cannot be made larger than the range of the rectangular range C, an area outside the range C becomes an area over which control is not assigned. For that reason, as shown in FIG. 13, the area outside the range C is displayed in white (alternatively, this may be gray display or the like), such that the area that is not assigned control can be visually recognized.

Figure 14:
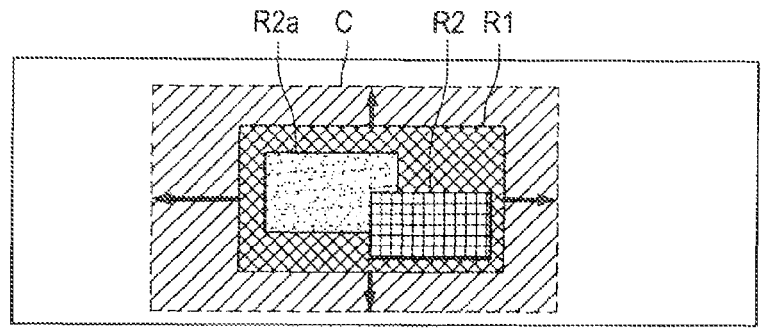
FIG. 14 is a schematic diagram that shows a case in which the client terminal has a control right for mechanical PTZ and the other client terminal has the control right for the digital PTZ.

FIG. 14 shows a case in which the client terminal 200 has the control right for the mechanical PTZ operations and the other client terminal 200 has the control right for the digital PTZ operations. In this case, a range in which the mechanical PTZ operations can be performed is a range (the rectangular range C indicated by broken lines in FIG. 14) that includes the image area R2 (indicated as the image area R2a in FIG. 14), for which the control right for the digital PTZ operations is owned by the other client terminal 200.

In the example shown in FIG. 14 also, as it is normally not necessary to display the image area R2a and the range C indicated by the broken lines, it is also possible that the image area R2a and the range C are displayed on the client terminal 200 that has the control right for the mechanical PTZ operations only when the user performs the PTZ operations.

Further, in the example shown in FIG. 14 also, the area outside the range C is displayed in white (alternatively, this may be gray display or the like), such that the area that is not assigned control can be visually recognized.

Figure 15:
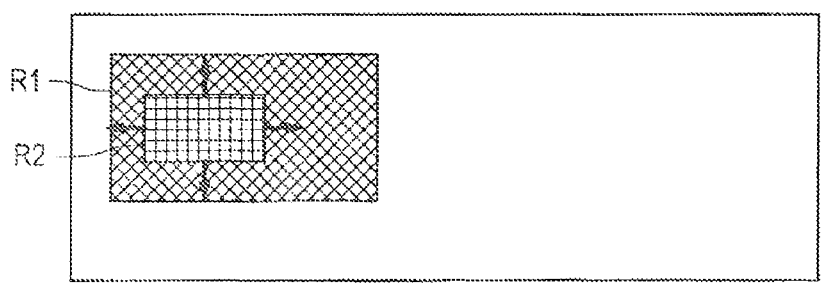
FIG. 15 is a schematic diagram that shows a case in which the client terminal has the control right for the digital PTZ, and the other client terminal has the control right for the mechanical PTZ.

FIG. 15 shows a case in which the client terminal 200 has the control right for the digital PTZ operations and the other client terminal 200 has the control right for the mechanical PTZ operations. In this case, a range in which operation is possible of the image area R2 that is defined by the digital PTZ operations is within the mechanical PTZ range (the image area R1) that is set by the other client terminal 200. The image area R1 is changed by operation by the other client terminal 200 that has the control right for the mechanical PTZ operations. Note that, when the other client terminal 200 has the control right for the mechanical PTZ operations, the image of the image area R1 can be viewed at a later stage, for example, by recording an image (an image apart from the image area R2) that cannot be displayed as live video in the partial image area in advance in the server 400.

(2) Example of Assigning Control Right

As described above, with respect to the image area R2 defined by the digital PTZ operations, by transmitting a plurality of image streams from the camera terminal device 100 via the network 300, the plurality of different client terminals 200 can acquire videos of the different image areas R2. FIG. 16 is a schematic diagram that shows a state in which two different videos (video 1 and video 2) corresponding to the image area R2 are transmitted to each of the client terminals 200. Here it is assumed, for example, that the video 1 corresponds to the image area R2 shown in FIG. 13 and the video 2 corresponds to the image area R2a shown in FIG. 13.

As shown in FIG. 16, when the two videos (the video 1 and the video 2) can be operated, when control for either the video 1 or the video 2 is available, an available video control right is assigned to the next client terminal 200 that enters into operation of the video.

For example, when the control right for both the video 1 and the video 2 is available, the first client terminal 200 to enter (here, an operator 1) can obtain the control right for one of either the video 1 or the video 2. Here it is assumed that the operator 1 obtains the control right for the video 1 and operates the video 1. During a time in which the operator 1 holds the control right for the video 1, in accordance with the above-described processing, the operator 1 can freely operate a range of the video 1 and can acquire live video of a desired area.

Next, in a state in which the operator 1 holds the control right for the video 1, a newly entered client terminal 200 (here, an operator 2) obtains the control right for the video 2, as the control right for the video 2 is available. In this way, during a time in which the operator 2 holds the control right for the video 2, the operator 2 can freely operate a range of the video 2 and can acquire live video of a desired area. It should be noted that when the control right for the video 1 is not available, even if the control right for the video 2 is available, it is also possible to wait until the control right for the video 1 becomes available.

Next, in a state in which the operator 1 holds the control right for the video 1, and the operator 2 holds the control right for the video 2, the next client terminal 200 to enter (here, an operator 3) cannot obtain the control right as the control right for both the video 1 and the video 2 is held by the operator 1 and the operator 2. For that reason, the operator 3 is on stand-by until the control right for the video 1 or the video 2 becomes available. As with the terminal of the client C shown in FIG. 4, while on stand-by, the client terminal 200 normally sees the same video as the other client terminal 200 that has control, such as the terminal of the client A. In addition, when an operator 4 enters after that, control is acquired in order from the client terminal 200 entering at an earlier time, when control becomes available.

The time during which the control right is held can be set in advance, for example. The timer 112 of the camera terminal device 100 counts a time that each of the operators respectively holds the control right, and when a period of time that is determined in advance elapses, the control right of the operator is cancelled. As an example, when the period of time to hold the control right is 15 minutes, in the above-described example, when 15 minutes has elapsed from when the operator 1 obtains the control right for the video 1, control right for the video 1 by the operator 1 is cancelled. As a result, it is possible for the operator 3 that is on stand-by to acquire the control right for the video 1 and operate the video 1. Further, when 15 minutes has elapsed from when the operator 2 obtains the control right for the video 2, the control right of the video 2 by the operator 2 is cancelled. As a result, it is possible for the operator 4 that is on stand-by to acquire the control right for the video 2 and operate the video 2.

A similar procedure can be performed when the control right is assigned with respect to the mechanical image area R1 also. However, it should be noted that as there is the single camera terminal device 100 in the system, the control right for the image area R1 is assigned to only one of the client terminals 200. When, for example, the control right for the image area R1 is available, the first client terminal 200 to enter (here, the operator 1) can acquire the control right for the image area R1. The client terminal 200 (here, the operator 2) that enters in the state in which the operator 1 holds the control right for the image area R1 is on stand-by until the control right for the image area R1 is available.

(3) Processing Relating to Assignment of Control Right

When attempting to acquire the control right, the user performs an operation from the client terminal 200 to select the image area R1 or the image area R2. A case explained here is when a chosen one of the client terminals 200 shown in FIG. 15 acquires the control right for the video 1 of the image area R2. The operation in this case is performed, for example, by using the input portion 206, such as a mouse, a keyboard or the like, to specify an outer frame of the video 1 displayed on the display portion 208. However, the present disclosure is not limited to this example. In response to the above-described operation, the transmitting/receiving portion 202 transmits to the camera terminal device 100 information (control request information) indicating that the client terminal 200 is trying to acquire the control right for the video 1. Note that when the client terminal 200 is trying to acquire the control right for the video 2, information (control request information) indicating that the client terminal 200 is trying to acquire the control right for the video 2 is transmitted to the camera terminal device 100.

The control request information is transmitted via the network 300 to the camera terminal device 100, is received by the transmitting/receiving portion 106 and is then transmitted to the control portion 108. When the control right has not been assigned for the video 1 or of the video 2 for which the control request is issued, the control portion 108 assigns the control right to the client terminal 200 that transmitted the control request information and records the IP address of the client terminal 200. In this way, when the control portion 108 receives information specifying the area of the video 1 from the client terminal 200 to which the control right is assigned, the control portion 108 extracts a section corresponding to the specified area from the whole image (live video) that is transmitted from the camera portion 102, and issues a command to encode the extracted section of the area only. The transmitting/receiving portion 106 receives live video of the area A on which encoding processing has been performed from the image processing portion 104 and transmits, via the network 300, the encoded area A to the client terminal 200 that has the control right.

Assignment of the control right for the mechanical image area R1 can be performed in a similar manner. The user performs an operation from the client terminal 200 to select the image area R1. The operation is performed, for example, by using the input portion 206, such as a mouse, a keyboard or the like, to specify an outer frame of the image area R1 displayed on the display portion 208. However, the present disclosure is not limited to this example. In response to the above-described operation, the transmitting/receiving portion 202 transmits to the camera terminal device 100 information (control request information) indicating that the client terminal 200 is trying to acquire the control right for the image area R1.

The control request information is transmitted via the network 300 to the camera terminal device 100, is received by the transmitting/receiving portion 106 and is then transmitted to the control portion 108. When the control right has not been assigned for the image area R1 for which the control request is issued, the control portion 108 assigns the control right to the client terminal 200 that transmitted the control request information and records the IP address of the client terminal 200. In this way, when the control portion 108 receives information specifying the area of the image area R1 from the client terminal 200 to which the control right is assigned, the control portion 108 mechanically controls the pan, tilt and zoom of the camera portion 102. The camera portion 102 thus transmits video corresponding to the image area R1 to the image processing portion 104. From among the live video transmitted from the camera portion 102, the image processing portion 104 extracts a section corresponding to the area specified by the image area R2 and performs encoding processing on the extracted section of the area only. The transmitting/receiving portion 106 receives the live video of the image area R2 on which encoding processing has been performed from the image processing portion 104 and transmits, via the network 300, the encoded image area R2 to the client terminal 200 that has the control right. Note that, when the video is extracted by the image processing portion 203 of the client terminal 200, after the live video acquired by the camera portion 102 has been encoded, the encoded live video is transmitted to the client terminal 200 via the network 300 and the video is extracted by the image processing portion 203.

It should be noted that, settings of the control according to the third embodiment can be applied to both the first embodiment and the second embodiment.

According to the above-described third embodiment, depending on the presence or absence of respective control rights for the mechanical PTZ, operations and the digital PTZ, operations, it is possible to optimally control the image area R1 and the image area R2 on the client terminal 200.

The exemplary embodiments of the present disclosure are described in detail above with reference to the accompanying drawings. However, the present disclosure is not limited to the examples described above. It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-171344 filed in the Japan Patent Office on Jul. 30, 2010, the entire content of which is hereby incorporated by reference.

What is claimed is:

1. A camera device comprising:
a first information acquisition portion that acquires first information used to control a first area that is specified within a whole image captured by a camera portion;
a second information acquisition portion that acquires second information used to control a second area that is specified within the whole image;
a control portion that controls mechanical movement of the camera portion based on the first information; and
an image processing portion that acquires an image of the first area from the whole image captured by the camera portion, and that extracts an image of the second area from within the first area based on the second information.

2. The camera device according to claim 1,
wherein when a change of the first area is not specified by the first information and the second area is changed within the first area, the control portion fixes movement of the camera portion, and
wherein the image processing portion extracts the image of the second area that is changed within the first area.

3. The camera device according to claim 1,
wherein when the first area is changed in a range that includes the second area, the image processing portion does not change a position of the second area and extracts the image of the second area from within the first area.

4. The camera device according to claim 1,
wherein the control portion controls movement of the camera portion based on the first information, and also, when the second area is specified such that it exceeds a range of the first area, the control portion controls movement of the camera portion based on the second information.

5. The camera device according to claim 1,
wherein when the second area moves in accordance with movement of the camera portion and is located outside the first area, the image processing portion changes the second area such that the second area is within the first area and extracts the image of the second area.

6. The camera device according to claim 1,
wherein when the second area is changed, the control portion controls movement of the camera portion such that a positional relationship between the first area and the second area is maintained in a same state.

7. The camera device according to claim 1,
wherein when the first area is changed, the image processing portion changes the second area such that a positional relationship between the first area and the second area is maintained in a same state and extracts the image of the second area.

8. A camera system in which a camera terminal device that captures images and a client terminal device that controls the camera terminal device are connected via a network,
wherein the camera terminal device comprises:
a first information acquisition portion that acquires first information used to control a first area that is specified within a whole image captured by a camera portion;
a second information acquisition portion that acquires second information used to control a second area that is specified within the whole image;

a control portion that controls mechanical movement of the camera portion based on the first information; and an image processing portion that acquires an image of the first area from the whole image captured by the camera portion, and that extracts an image of the second area from within the first area based on the second information.

9. A control device comprising:

a first information acquisition portion that acquires first information used to control a first area that is specified within a whole image captured by a camera terminal device;

a second information acquisition portion that acquires second information used to control a second area that is specified within the whole image;

a transmitting portion that transmits to the camera terminal device control information used to control mechanical movement of a camera portion based on the first information; and an image processing portion that acquires an image of the first area from the whole image captured by the camera portion, and that extracts an image of the second area from within the first area based on the second information.

10. The control device according to claim 9, further comprising:

a display portion that displays both the whole image and a partial image corresponding to the image of the second area.

11. The control device according to claim 9, wherein the transmitting portion transmits control information to control movement of the camera portion based on the first information, and also to control movement of the camera portion based on the second information when the second area is specified such that the second area exceeds a range of the first area.

12. The control device according to claim 9, wherein when the second area moves in accordance with movement of the camera portion and is located outside the first area, the image processing portion changes the second area such that the second area is within the first area and extracts the image of the second area.

13. The control device according to claim 9, wherein when the second area is changed, the transmitting portion transmits control information to control movement of the camera portion such that a positional relationship between the first area and the second area is maintained in a same state.

14. The control device according to claim 9, wherein when the first area is changed, the image processing portion changes the second area such that a positional relationship between the first area and the second area is maintained in a same state and extracts the image of the second area.

15. A non-transitory computer readable medium for storing a program that comprises instructions that command a computer to function as:

a unit that acquires first information used to control a first area that is specified within a whole image captured by a camera portion;

a unit that acquires second information used to control a second area that is specified within the whole image;

a unit that controls mechanical movement of the camera portion based on the first information; and a unit that acquires an image of the first area from the whole image captured by the camera portion, and extracts an image of the second area from within the first area based on the second information.

* * * * *